(12) United States Patent
Jones et al.

(10) Patent No.: US 8,025,004 B2
(45) Date of Patent: *Sep. 27, 2011

(54) TRANSPARENT CERAMIC COMPOSITE

(75) Inventors: Christopher D. Jones, Amherst, NH (US); Jeffrey B. Rioux, Bedford, NH (US); John W. Locher, Amherst, NH (US); Eric S. Carlson, Kunkletown, PA (US); Kathleen R. Farrell, Emmaus, PA (US); Brian C. Furchner, Fogelsville, PA (US); Vincent Pluen, Courtry (FR); Matthias Mandelartz, Herzogenrath (DE)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/845,611

(22) Filed: Jul. 28, 2010

(65) Prior Publication Data

US 2010/0288117 A1 Nov. 18, 2010

Related U.S. Application Data

(63) Continuation of application No. 12/549,985, filed on Aug. 28, 2009, now Pat. No. 7,793,580, which is a continuation of application No. 11/423,210, filed on Jun. 9, 2006, now Pat. No. 7,584,689.

(60) Provisional application No. 60/689,688, filed on Jun. 10, 2005, provisional application No. 60/761,814, filed on Jan. 25, 2006.

(51) Int. Cl.
*F41H 5/08* (2006.01)

(52) U.S. Cl. ............. 89/36.02; 89/903; 89/905; 89/906; 89/918

(58) Field of Classification Search .................. 89/36.02, 89/36.01, 36.03–36.17; 109/49.5
See application file for complete search history.

(56) References Cited

U.S. PATENT DOCUMENTS

| | | |
|---|---|---|
| 3,471,266 A | 10/1969 | La Belle, Jr. |
| 3,591,348 A | 7/1971 | La Belle, Jr. |
| 3,634,177 A | 1/1972 | Glaser |
| 3,846,082 A | 11/1974 | La Belle, Jr. et al. |
| 3,915,662 A | 10/1975 | La Belle, Jr. et al. |
| 3,953,174 A | 4/1976 | La Belle, Jr. |
| 4,028,476 A | 6/1977 | Kleinschmidt et al. |
| 4,079,161 A | 3/1978 | Kile |
| 4,126,731 A | 11/1978 | Nishizawa et al. |
| 4,402,786 A | 9/1983 | Little et al. |
| 4,704,943 A | 11/1987 | McDougal |
| 4,930,731 A | 6/1990 | Roy et al. |
| 5,398,640 A | 3/1995 | Locher et al. |

(Continued)

FOREIGN PATENT DOCUMENTS

| | | |
|---|---|---|
| GB | 2044630 | 10/1980 |

(Continued)

OTHER PUBLICATIONS

European Office dated Aug. 11, 2008 issued in corresponding European Patent Application No. 06 772 823.8, 3 pages.

(Continued)

*Primary Examiner* — Bret Hayes
(74) *Attorney, Agent, or Firm* — Finch & Maloney PLLC

(57) ABSTRACT

A ceramic composite and method of making are provided. The ceramic composite is transparent and serves as transparent armor. The composite provides adequate protection from projectiles while exhibiting large surface areas and relatively low areal densities.

20 Claims, 4 Drawing Sheets

U.S. PATENT DOCUMENTS

| | | | |
|---|---|---|---|
| 5,451,553 | A | 9/1995 | Scott et al. |
| 5,558,712 | A | 9/1996 | Kalejs |
| 5,758,845 | A | 6/1998 | Sunne et al. |
| 6,009,789 | A | 1/2000 | Lyons |
| 6,475,942 | B1 | 11/2002 | Brewer et al. |
| 7,348,076 | B2 | 3/2008 | Locher et al. |
| 7,584,689 | B2* | 9/2009 | Jones et al. .......... 89/36.02 |
| 7,793,580 | B2* | 9/2010 | Jones et al. .......... 89/36.02 |
| 2005/0227117 | A1 | 10/2005 | Locher et al. |
| 2009/0308239 | A1* | 12/2009 | Jones et al. .......... 89/36.02 |
| 2010/0288117 | A1* | 11/2010 | Jones et al. .......... 89/36.02 |

FOREIGN PATENT DOCUMENTS

| | | |
|---|---|---|
| JP | 57095899 | 6/1982 |
| SU | 1758913 | 8/1992 |
| WO | WO 03/068501 A1 | 8/2003 |
| WO | 2005100646 | 10/2005 |
| WO | 2008130457 | 10/2008 |

OTHER PUBLICATIONS

US Office Action dated Oct. 31, 2008 issued in U.S. Appl. No. 11/423,203, 9 pages.

Australian Examiners Report dated Mar. 24, 2009 cited in Australian application No. 2006257867, 2 pages.

Locher, J. W., et al., "The Production of 225×325 mm Sapphire Windows for IR (1-5 μm) Applications", Window and Dome Technologies VIII, Proceedings of SPIE, 2003, pp. 40-46, vol. 5078.

Antonov, et al., A Review of Developments in Shaped Crystal Growth of Sapphire by the Stepanov and Related Techniques, Progress in Crystal Growth and Characterization of Materials, 2002, 60 pages.

Locher, et al., Large Diameter Sapphire Window from Single Crystal Sheets, Proceedings of the Fifth DOD Electromagnetic Window Symposium, Oct. 1993, 10 pages.

Novak, et al., The Production of EFG Sapphire Ribbon for Heteroepitaxial Silicon Substrates, Journal of Crystal Growth 50, 1980, 8 pages, vol. 50.

Canadian Office Action dated Sep. 3, 2008 issued in Canadian Patent Application No. 2,560,998, 4 pages.

Chinese Office Action dated Jul. 4, 2008 issued in Chinese Patent Application No. 200580012188.0, 18 pages.

International Search Report dated Jul. 28, 2005 issued in PCT Application No. PCT/US2005/011404, 3 pages.

Labelle, Jr., EFG, The Invention and Application to Sapphire Growth, Journal of Crystal Growth 50, 1980, 10 pages, vol. 50.

US Office Action dated Jul. 28, 2005 issued in U.S. Appl. No. 10/820,468, 13 pages.

US Office Action dated Mar. 9, 2006 issued in U.S. Appl. No. 10/820,468, 7 pages.

US Office Action dated Dec. 4, 2006 issued in U.S. Appl. No. 10/820,468, 7 pages.

Wada, et al., Growth and Characterization of Sapphire Ribbon Crystals, Journal of Crystal Growth 50, 1980, 9 pages, vol. 50.

European Office Action dated Feb. 23, 2009 issued in European Patent Application No. 06 772, 823.8, 3 pages.

US Office Action dated Apr. 2, 2008 issued in U.S. Appl. No. 11/423,209, 14 pages.

Written Opinion of the International Searching Authority, dated Nov. 22, 2006, 10 pages.

International Search report dated Nov. 22, 2006, 5 pages.

"AFRL Test Transparent Armor" by Laura Lundin downloaded on Oct. 1, 2006 http://www.udri.udayton.edu/news/news1005.htm, 2 pages.

"Air Force Testing New Transparent Armor" by Laura Lundin downloaded on Oct. 1, 2006 http:www.af.mil/news/story.asp?id=123012131, 2 pages.

"Oran OSG Armor", Israel at Eurosatory 2004, downloaded from www.oran.com, 3 pages.

"Army Materials Research: Transforming Land Combat Through New Technologies", AMPTIAC Quarterly, vol. 8, No. 4; 2004, 11 pages.

Transparent Armor, AMPTIAC, vol. 4, No. 3; Fall 2000, 24 pages.

"Transparent Armor Systems", US Armor Research Laboratory, 2 pages, date unknown.

Abstract for the 30th International Conference and Exposition on Advanced Ceramics and Composites: Large EFG Sapphire for Transparent Armor, Control ID:191574, 1 page, Jan. 22-28, 2006.

"Large-Area Sapphire for Transparent Armor", American Ceramic Society Bulletin, Mar. 2006, vol. 85, No. 3, 6 pages.

"Armor anti-Armor Materials by design", by Donald J. Sandstrom, Los Alamos Science, Summer 1989, 15 pages.

"Enhanced Vision System", downloaded on Jan. 5, 2007 from www.kollsman.com/products/commercial-aviation-systems/enhanced-vision-system.asp, 2 pages.

Harris, D.C., Materials for infrared windows and domes, properties and performance, SPII Optical Engineering Press, Bellingham, WA, 36 (1999), p. 105, 117, 118, 128 and 135.

Surmet Corp. Company Literature #M301030, 1 page, date unknown.

Patel, P.J., et al., "Transparent Armor", Advanced Materials and Processes Technology, The AMPTIAC Newsletter, Fall 2000, vol. 4, No. 3.

"Emerging Scanning Results: Transparent Ceramics", U.S. Army Research Laboratory, downloaded on Jun. 11, 2006 www.arl.army.mil/wmrd, 2 pages.

"HMMWV Lightweight Replacement Armored Door" Specs from web:www2.eps.gov, 3 pages, date unknown.

Gentilman, R. et al., "Large-area sapphire windows", Society of Photo-Optical Instrumentation Engineers 2003, vol. 5078, pp. 54-60.

U.S. Statutory Invention Registration #H1519, Published Mar. 5, 1996.

U.S. Statutory Invention Registration #H1567, Published Aug. 6, 1996.

Gentilman, R., et al., "Low-cost sapphire windows", Copyright 2003 Society of Photo-Optical Instrumentation Engineers published in SPIE vol. 5078, pp. 12-17.

European Office Action dated Mar. 19, 2008 issued in corresponding European patent application No. 06772823.8, 5 pages.

Notice of Allowance dated Oct. 27, 2009 issued in corresponding Russian Patent Application No. 2007145539, 2 pages.

* cited by examiner

| Sample | Composition | Length (mm) | Width (mm) | Thickness (mm) | Mass (kg) | Areal Density kg/m² | Projectile | Projectile Velocity m/s | Penetration |
|---|---|---|---|---|---|---|---|---|---|
| 1 | A | 150 | 150 | 21.1 | 1.22 | 52.12 | 7.62x51 M-80 Ball | 835 | no |
| 2 | A | 150 | 150 | 21.1 | 1.22 | 52.12 | 7.62x39 API-BZ | 696 | no |
| 3 | A | 150 | 150 | 21.1 | 1.22 | 52.12 | 7.62x39 API-BZ | 746 | no |
| 4 | A | 150 | 150 | 21.1 | 1.22 | 52.12 | 7.62x39 API-BZ | 776 | no |
| 5 | A | 150 | 150 | 21.1 | 1.22 | 52.12 | 7.62x51 AP(M61) | 768 | no |
| 6 | A | 150 | 150 | 21.1 | 1.22 | 52.12 | 7.62x51 AP(M61) | 846 | yes |
| 7 | A | 150 | 150 | 21.1 | 1.22 | 52.12 | 7.62x51 AP(M61) | 864 | yes |
| 8 | A | 150 | 150 | 21.1 | 1.22 | 52.12 | 7.62x51 AP(M61) | 867 | yes |
| 9 | B | 150 | 150 | 29.4 | 1.63 | 72.78 | 7.62x54R B32 | 857 | no |
| 10 | B | 150 | 150 | 29.4 | 1.63 | 72.78 | 7.62x54R B32 | 858 | no |
| 11 | B | 150 | 150 | 29.4 | 1.63 | 72.78 | 7.62x54R B32 | 855 | no |
| 12 | C | 150 | 150 | 24.87 | | 67.46 | 7.62x54R B32 | 864 | no |
| 13 | D | 150 | 150 | 43.78 | | 159.21 | 7.62x51 AP-WC | 917 | no |
| 14 | D | 150 | 250 | 43.64 | | 159.21 | 7.62x51 AP-WC | 914 | no |
| 15 | E | 150 | 150 | 46.21 | | 169.11 | 7.62x51 AP-WC | 918 | no |
| 16 | E | 150 | 250 | 46.3 | | 169.11 | 7.62x51 AP-WC | 921 | no |
| 17 | E | 150 | 150 | 46.25 | | 169.11 | 7.62x51 AP-WC | 917 | no |
| 18 | E | 150 | 150 | 46.56 | | 169.11 | 7.62x51 AP-WC | 920 | no |
| 19 | F | 300 | 300 | 41.85 | | 107.97 | 7.62 x 63mm APM2 | Shot #1: 851<br>Shot #2: 864<br>Shot #3: 846 | no<br>no<br>no |

FIG. 2 Table 1

US 8,025,004 B2

TRANSPARENT CERAMIC COMPOSITE

RELATED APPLICATIONS

This application is a continuation of pending U.S. application Ser. No. 12/549,985, filed Aug. 28, 2009, titled TRANSPARENT CERAMIC COMPOSITE, which is a continuation of U.S. application Ser. No. 11/423,210, now U.S. Pat. No. 7,584,689, filed Jun. 9, 2006 and titled TRANSPARENT CERAMIC COMPOSITE and claims benefit of U.S. Provisional Patent Application Ser. No. 60/689,688, titled TRANSPARENT CERAMIC COMPOSITE, filed Jun. 10, 2005 and U.S. Provisional Patent Application Ser. No. 60/761,814, titled TRANSPARENT CERAMIC COMPOSITE, filed Jan. 25, 2006. The content of each of these applications is hereby incorporated by reference herein.

BACKGROUND OF INVENTION

1. Field of Invention

The present invention relates to ceramic composites and, in particular, to transparent ceramic armor.

2. Discussion of Related Art

Ceramics exhibit a variety of properties that make them useful in products subjected to, for example, abrasion, high temperatures or high speed impacts. An excellent strength to weight ratio and superior hardness mean that ceramics can often replace and improve on structural materials such as steel, polymers and glass. Ceramic composites are materials that include a ceramic bonded to another ceramic or to a non-ceramic material. For example, a ceramic sheet can be bonded to glass or plastic or another ceramic to form a ceramic composite. Ceramic composites may allow the useful properties of ceramics to be exploited while providing a product that is, for example, lighter, more flexible or less expensive than a purely ceramic material.

Ceramics can be opaque, translucent or transparent. Transparent ceramics are of particular interest because they can provide an impact resistant, scratch resistant and heat resistant material that can replace transparent glass or polymers. While ceramic sheets are typically more expensive to produce than are glass or polymeric sheets, the superior properties of ceramics may make them the material of choice for use in small windows where scratch resistance, high strength and transmission of light are desired under extreme conditions or in harsh environments.

Composites of ceramic and other materials such as glass and polycarbonate have been suggested as impact resistant transparent armor. For example, United States Statutory Invention Registration No. H1567 describes a transparent composite armor having a hard frangible face plate backed by a more resilient plate. United States Statutory Invention Registration No. H1519 describes the bonding of transparent aluminum oxide or magnesium oxide to a backup plate of transparent plastic. However, to provide sufficient transparency and strength, these composites may be thick, heavy, and expensive and may only be available in small sizes that provide for limited viewing areas. As a result, ceramic composites have not been widely used as transparent armor. Advancements in the field that can, for example, reduce weight and cost while increasing surface area should lead to improved armor and to greater use of ceramics in this field.

SUMMARY OF INVENTION

In one aspect, a composite transparent armor is provided, the armor having a $V_{50}$ of greater than 843 m/s for caliber 0.30 AP projectiles, a surface dimension greater than 25 cm, an areal density of less than 58.7 kg/m² and a luminous transparency of greater than 75%.

In another aspect, a composite transparent armor is provided, the armor having a $V_{50}$ of greater than 835 m/s for a 7.62×51 mm M80 ball, a surface dimension greater than 25 cm, an areal density of less than 60.0 kg/m² and a luminous transparency of greater than 75%.

In another aspect, a composite transparent armor is provided, the armor having a $V_{50}$ of greater than 858 m/s for a 7.62×54R B32 API projectile, the armor having a surface dimension greater than 25 cm, an areal density of less than 115 kg/m² and a luminous transparency of greater than 75%.

In another aspect, a composite transparent armor is provided, the armor having a $V_{50}$ of greater than 918 m/s for a 7.62×51 AP-WC projectile, a surface dimension greater than 25 cm, an areal density of less than 200 kg/m² and a luminous transparency of greater than 75%.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2 provides test data in tabular form;

DETAILED DESCRIPTION

Figure 1:
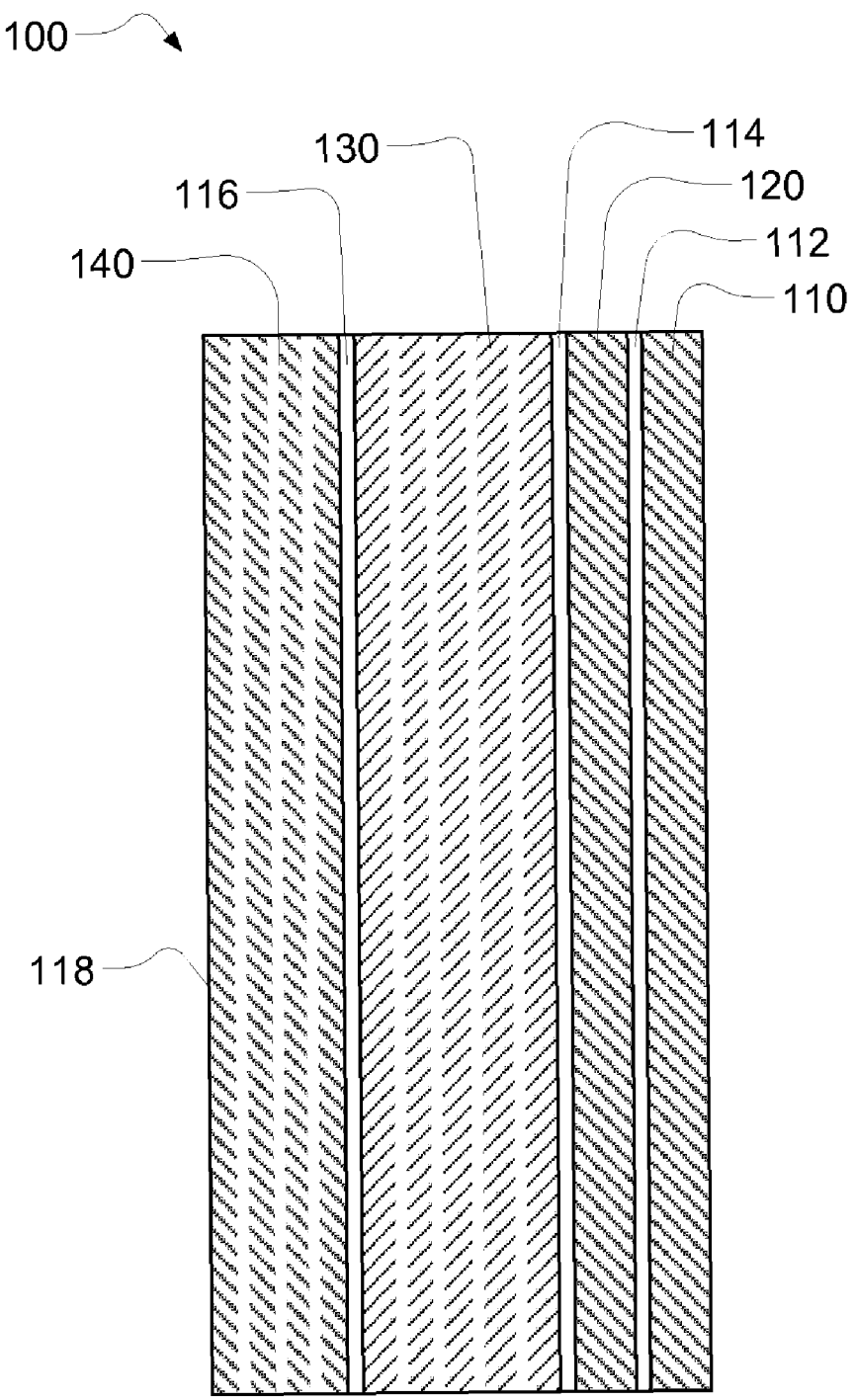
FIG. 1 is schematic diagram showing a cutaway view of a ceramic composite.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In one aspect, the invention relates to a transparent ceramic composite useful in providing protection from high speed projectiles while allowing the transmission of light. The composite may provide a protective window that can be used in, for example, aircraft, spacecraft, underwater vehicles, and civilian or military ground vehicles. The composite may offer a high strength to weight ratio as well as an improved field of vision when compared to other materials. The ceramic component of the composite may be, for example, a non-polycrystalline ceramic such as single crystal sapphire ($Al_2O_3$). Other components of the composite may include, for example, glass and/or polymeric materials.

As used herein, an "adhesive" is a material capable of joining two solids together so that they do not separate when subjected to an intended use. Adhesives may be either temporary or permanent.

"Areal density" is the mass per unit of surface area of a material.

A "composite" is an article made by bonding two or more separate materials together. The materials may be of the same or dissimilar composition.

A "frangible" material is one that is designed to shatter when impacted by a projectile of sufficient momentum. A non-frangible material is designed to maintain its structure after impact.

"Single Crystal sapphire" means $\alpha$-$Al_2O_3$, also known as corundum, that is primarily single crystal.

"Spinel" is used as is known in the art and refers to a ceramic material having a spinel crystal structure, such as $MgAl_2O_4$.

A "translucent" material is known to those skilled in the art and allows the transmission of light but does not provide for a clear image of objects viewed through the material.

A "transparent" material is known to those skilled in the art and allows for transmission of light and provides a clear, discernable image of objects viewed through the material. A "visible transparent" material is transparent in the visible range. An "IR transparent" material is transparent in the IR range and a "UV transparent" material is transparent in the UV range.

"$V_{50}$" refers to an armor rating and describes the velocity of a specific projectile at which a given armor is penetrated 50% of the time. The projectile impacts the armor at an angle substantially normal to the plane of the armor at the point of impact. Thus, an armor having a $V_{50}$ of 2770 fps (844 m/s) for caliber 0.30 AP rounds would be penetrated by approximately 50% of hits received at that velocity.

In one aspect, ceramic composites described herein may be used as armor. The composite is preferably transparent and can withstand impact from projectiles such as bullets or space debris. The composite may protect the occupant of a vehicle from small arms fire, shrapnel, explosives and other projectiles that a vehicle may be exposed to when under fire. The composite material may provide a clear field of vision, allowing an occupant to view surroundings through the armor. The composites may be flat (planar) or curved at one or more locations. The materials, thickness, size and weight of the ceramic composite may be varied depending on the anticipated use of the ceramic composite. Lighter, thinner composites may be used for less demanding applications and thicker, heavier composites may be used to protect against more powerful projectiles and multiple hits. In some embodiments, the transparent armor can remain intact and functional after one or more hits from small arms fire, for example, caliber 0.30 AP rounds. Transparent armor can be designed to protect against a number of different firearms, including equal to or greater than caliber 0.22, 0.223, 0.30, 0.50 (inch), 5.56 mm, 5.45 mm, 6.8 mm and 7.62 mm rounds.

In some embodiments, the transparent ceramic composite can be a laminate of two, three or more different structural components. For example, the composite may include a ceramic sheet bonded to a glass sheet which is bonded to a polymeric sheet. Or the composite may be a ceramic sheet bonded to a polymeric sheet bonded to a second type of polymeric sheet. The ceramic sheet may be non-polycrystalline and may be a single crystal ceramic such as single crystal sapphire. The resulting composite sandwich, such as that shown in FIG. 1, may be used as transparent armor. FIG. 1 provides a cross-sectional view of a portion of one type of composite. Composite 100 includes an outer layer such as a sheet of transparent ceramic, e.g., single crystal sapphire sheet 110. Sheet 110 can be bonded directly to an intermediate layer such as glass sheet 130 or may include one or more intervening additional sapphire sheets, such as sheet 120. If two or more sapphire sheets are used, they are typically of the same or similar surface area although the thicknesses may be the same or different. The surface of glass sheet 130 that opposes the surface bonded to the sapphire sheet may be in turn bonded to an inner sheet, e.g., a polymeric sheet such as polycarbonate sheet 140. Multiple sheets of glass and/or polymeric sheets may also be used. Each component of the composite may be bonded to the adjacent component. Adhesion or bonding can be achieved using a variety of mechanical or chemical means including, for example, heat-cured adhesives, radiation-cured adhesives, time cured adhesives, chemical cured adhesives and/or catalyst-cured adhesives. Adhesive layers 112, 114 and 116 may be of identical, similar or different materials. Polycarbonate layer 140 may be coated (on an exposed surface) with an additional coating 118 that can provide, for example, scratch and/or fog resistance.

A resulting ceramic composite may include a series of layers such as ceramic/adhesive/glass/adhesive/polymer. Multiple layers of each type may be included. A more specific composite may include, for example, sapphire sheet(s)/polyvinyl butyral adhesive/low iron glass/thermoplastic polyurethane (TPU) adhesive/polycarbonate. Thicknesses of each layer may vary with adhesive layers typically being of a minimum thickness required to bind the sheets. The ceramic sheet may be, for example, from 0.05 to 2 or 3 cm in thickness. The intermediate glass layer may be, for example, from 0.1 to 10 or 15 cm in thickness. The inner polycarbonate layer may be, for example, from 0.1 to 5 cm in thickness. The TPU sheet may be an adhesive sheet that adheres the polycarbonate layer to another layer, for example, glass. In other embodiments, the layer of adhesive, e.g., TPU, and polycarbonate may be replaced by a single material, such as FAENAC® film (FAE) available from Saint-Gobain Sully, France. FAE may be directly laminated to glass or other surfaces and a layer about 1 mm in thickness can be used in place of a TPU/PC layer of about 4.5 mm in thickness. Typically, a polycarbonate or FAE layer faces the interior of a vehicle in which the composite has been installed.

One or more sheets of glass may be used in a composite. Some embodiments may include 2, 3, 4 or more glass sheets. Glass sheets may be arranged to provide, for example, optimum protection and/or optimum visibility. In some cases, glass sheets may be adjacent each other, may be joined by an adhesive to each other or may be joined to other components of the composite.

When a glass sheet is used, different embodiments may use different types of glass. For example, various types of glass may provide different strength or optical characteristics. Glass types that may be used include low iron glass, borosilicate glass, "water white" glass, "extra white" glass, diamond glass (water white low iron) and RC diamond glass (chemically strengthened).

A ceramic composite may be of any shape and may be, for example, square, round, rectangular, trapezoidal or substantially polygonal. Rectangular shapes may be preferred for providing an expanded field of vision. The ceramic composite typically has a length, width and thickness although each dimension may vary throughout the composite. The composite may be substantially planar with the thickness being less than 50%, less than 25% or less than 10% of either the length or width. When used herein, length refers to the length of the smallest (area) hypothetical rectangle that could completely cover the composite or sheet being measured. For example, the length of a rectangle is its conventional length; the length of a circular piece is its diameter; and the length of a hexagon is the measurement between the two most distant vertices. Width refers to the width of the same hypothetical rectangle. Thickness refers to the dimension measured through a sheet or composite from one surface to the opposed surface. For example, a 30 cm by 45 cm by 3 cm ceramic composite has a thickness of 3 cm, a length of 45 cm and a width of 30 cm.

An important component of the composite is the ceramic sheet or sheets. The surface area of the composite may be covered by a single continuous ceramic sheet rather than by a mosaic or series of sheets adjoined edge to edge. Larger sheets may also be bonded together to form a mosaic. Larger sheets can result in fewer bond lines for the same size mosaic, and fewer bond lines may reduce the number of weak spots in the sheet and/or composite. Multiple sheets may be stacked one on top of the other. The ceramic sheet may be designed to be either frangible or non-frangible and may have an elastic modulus greater than that of glass or polycarbonate. The ceramic may have a high "hardness." Hardness includes resistance to plastic deformation, penetration resistance, indentation resistance and scratching resistance. The hardness of some ceramics, for example, single crystal sapphire, can provide improved scratch resistance that may be useful under adverse conditions such as in environments that include blowing sand. In some embodiments, the material may have a Vicker's hardness of greater than 1000, greater than 1500, greater than 1800 or greater than 1900 kg/mm$^2$. The ceramic may also have a high "toughness." Toughness is the amount of work required to deform one cubic inch of the material until it fractures. The ceramic sheet may be polycrystalline or single crystal ceramic. In some cases the sheet may be a sintered ceramic sheet although single crystal ceramics are often preferred due to, for example, superior optical qualities and/or better resiliency. Non-exhaustive examples of suitable ceramic materials include polycrystalline $Al_2O_3$, single crystal $Al_2O_3$ (sapphire), aluminum oxynitride and spinel. In some embodiments, the ceramic sheet may be essentially free of magnesium. The ceramic may exhibit a non-random crystal orientation and may possess an anisotropic hexagonal crystal structure.

Ceramic sheets may be produced from a boule. However, sheets produced from cross-sections of a boule may be limited in that a boule is typically cylindrical and thus has a circular cross-section. Therefore a sheet cut from a boule generally has a width that is limited to the diameter of the boule. While square sheets can be cut with minimal waste, rectangular sheets may be more costly to make and may involve additional cuts, with corresponding waste, in order to produce sheets having a length greater than the width. Although different shapes can be sliced from a boule, cutting sheets from a block of sapphire can be expensive and time consuming.

Multiple sheets of ceramic material may be affixed side-by-side to a common substrate to form a mosaic composite. The individual sheets may have edges butted against each other or may be joined by a framework of steel or other material. This design may not be preferred in some instances, e.g., where the field of vision is impaired due to the frequent interruptions of the framework.

In some embodiments, the use of single ceramic sheets of greater surface area may result in improved armor by, for example, more effectively dispersing an impact force and also providing an improved field of vision. Larger area sheets, for example, sheets having a length greater than 30, 40, 50, 60 or 70 cm can be made using "edge defined film fed growth" methods. Such methods of production are described in commonly-owned U.S. patent application by Locher et al titled "Single Crystals and Methods for Fabricating Same," U.S. patent application Ser. No. 10/820,468 filed on Apr. 8, 2004, which is incorporated by reference herein.

These methods can be used to produce single crystal sapphire sheets for use in composites and may have a dimension greater than 15 cm, greater than 20 cm or greater than 25 cm. The sheets may have a length that is substantially greater than the width. For example, the width may be less than or equal to 90%, 80%, 70% or 60% of the length. The thickness of the sheet may be substantially consistent and may be greater than or equal to 0.05 cm, 0.07 cm, 0.1 cm, 0.2 cm, 0.3 cm, 0.4 cm, 0.5 cm, 0.7 cm or 1 cm. Similarly, the sheets may have a thickness of less than 0.05 cm, 0.07 cm, 0.1 cm, 0.2 cm, 0.3 cm, 0.4 cm, 0.5 cm, 0.7 cm, 1 cm, 2 cm or 3 cm. In some embodiments, sapphire sheets are formed in substantially rectangular, square, round, polygonal, etc., shapes and may provide an ideal shape for transparent armor. In some embodiments the sheets may allow transmission of greater than 25%, 50%, 70%, 80%, or 90%, of visible, infrared and/or ultraviolet light. Significant transmission of wavelengths down to about 200 nm and up to about 2 to 3 um can also be achieved. The sheets typically have a high elastic modulus and can withstand a force at least equal to about 200× the force that would break any equivalent sheet of glass. The sheets may also be non-combustible in air and may exhibit superior heat transfer properties.

Ceramic sheets of larger surface area may provide an improved field of view and may also provide for wider dispersion of impact forces, resulting in greater protection, particularly against multiple hits. The result can be a non-frangible ceramic composite capable of protecting against multiple hits. While some forms of transparent armor are designed to fracture on impact, it is often preferred that the armor and/or the ceramic sheet portion of the armor stay intact after being impacted.

A variety of sizes of ceramic composites may be used, often depending on the intended application. The continuous (non-mosaic) ceramic sheets described herein may have, for example, surface areas of greater than 100 cm$^2$, greater than 200 cm$^2$, greater than 250 cm$^2$, greater than 300 cm$^2$, greater than 400 cm$^2$, greater than 500 cm$^2$ or greater than 1000 cm$^2$. Continuous composites made using the ceramic sheets may be of high surface area and the surface area divided by the thickness of the composite (cm$^2$/cm) may be, for example, greater than 10 cm, greater than 25 cm, greater than 50 cm, greater than 100 cm, greater than 250 cm, greater than 500 cm or greater than 1000 cm.

The areal density of the ceramic composite may also vary with the anticipated application. Thicker or additional outer, inner or intermediate sheets may be used to increase the strength of the composite and may result in an increase in areal density of the composite. Areal densities of the ceramic composite may be less than or equal to 200 kg/m$^2$, less than or equal to 100 kg/m$^2$, less than or equal to 80 kg/m$^2$, less than or equal to 70 kg/m$^2$, less than or equal to 58.7 kg/m$^2$, less than or equal to 52.8 kg/m$^2$, less than or equal to 45 kg/m$^2$, less than or equal to 40 kg/m$^2$, less than or equal to 30 kg/m$^2$, or less than or equal to about 17.5 kg/m$^2$.

Composites may exhibit different thicknesses depending, in part, on the anticipated use for the finished composite. For instance, composites for preventing the penetration of high momentum projectiles may be of greater thickness than those for preventing the penetration of lower momentum projectiles. Different embodiments may have thicknesses of, for example, greater than 200 mm, less than or equal to 200 mm, less than 150 mm, less than 120 mm, less than 100 mm, less than 80 mm, less than 70 mm, less than 60 mm, less than 50 mm, less than 40 mm, less than 30 mm or less than 25 mm.

The ceramic sheet and/or the ceramic composite may be planar or may include at least one radius. In many embodiments the ceramic sheet is substantially planar. A substantially planar sheet may be formed, for example, by edge defined film fed growth techniques and may result in a suitable sheet without any additional machining or fabrication. To produce a curved sheet that is not substantially planar, the sheet can be grown with a curved surface or a radius, such as a portion of a tube. Planar or non-planar sheets may be used to produce transparent ceramic composites, such as transparent armor that may be used as windshields in, for example, aircraft, spacecraft and vehicles such as trucks and armored personnel carriers.

A ceramic sheet, such as a sapphire sheet, may be formed of multiple sheets stacked together and a sheet can be bonded, for example, to a second or third sheet to produce a sapphire component of greater thickness. Each of the sheets may be of identical or similar dimensions and may be adhered to another sheet or sheets using known methods of bonding, such as by using adhesives or mechanical means such as clamps. Appropriate adhesives are preferably transparent and many are known to those skilled in the art. Adhesives may be heat-cured, radiation-cured, time cured, chemical cured and catalyst-cured and include, for example, polyurethanes, thermoplastic polyurethanes, epoxies, silicones, polyvinyl butyral, and metal-based adhesives.

In addition to a ceramic layer, a ceramic composite may include a backing material and may also include an intermediate layer. The backing layer (or inner layer) can help to provide, for example, support and impact force dispersion and can help to retain shards and projectiles that may otherwise pass through the composite. The backing material may be of any thickness or shape and may be thicker or thinner than the ceramic sheet. The backing material may be transparent and is preferably transparent at the same wavelengths as is the ceramic sheet with which it is used. For instance, a sapphire sheet that is transparent in the visible range may be bonded to a polycarbonate sheet that is transparent in the visible range. If the composite is to be used as an IR window, the backing material may be transparent to IR. Similarly, it may also be transparent to UV radiation. In some embodiments, an inner layer may be a polymer such as polycarbonate. The inner layer may include a coating on the inner (exposed) surface such as a scratch resistant or fog resistant coating. Many such coatings are known to those skilled in the art. Multiple sheets of backing material may be stacked together and may be adhered to each other using adhesives such as, for example, polyurethanes, thermoplastic polyurethanes, epoxies, silicones and metal-based adhesives. Materials such as conductive wires may also be placed against or between layers to provide, for example, resistive heating for defrosting or defogging. Suitable backing materials include transparent thermoplastic or thermosetting compositions such as acrylonitrile-butadiene-styrene (BS), acetal resins, cellulose acetate, cellulose acetate butyrate, cellulose acetate propionate, acrylics and modified acrylics, allyl resins, cellulose triacetate, chlorinated polyethers, ethyl cellulose, epoxy-rigid and flexible, fluoroplastics, ionomers-"Surlyn A" (DuPont), melamines, nylons, parylene polymers, phenolics transparent (thermosetting), phenoxy resins, polybutylene, polycarbonates, polyesters, polyethylenes, polyphenylene, polypropylene, polystyrene, polyurethanes (thermoplastic and thermosetting and high density), polysulphone, polyvinyl acetate (PVA), polyvinyl alcohol, polyvinyl fluoride, polyvinyl butyral, PVB/mylar laminate, polyvinylidene chloride, silicones, styrene-acrylonitride and styrene-butadiene copolymer.

Intermediate materials or layers may also be used and may provide, for example, support as well as force distribution. Intermediate layers may be bonded to both a ceramic layer and a backing layer. In some embodiments, the intermediate layer may be thicker or of greater mass than either the ceramic layer or the backing. As a result, the intermediate material may contribute greater than 40%, greater than 50%, greater than 60%, greater than 70%, greater than 80% or greater than 90% of the mass of the composite. In one set of embodiments, the intermediate layer is glass and in some embodiments low-iron glass may be used. An intermediate layer may be transparent over the same wavelength range as the outer (ceramic) and inner layers of the composite. For instance, if the outer and inner layers are transparent in the visible range, the intermediate layer may also be transparent in the visible range. The materials need not have common transmittance characteristics across an extended range of wavelengths, but it is preferred that the transmittance characteristics overlap to produce a sub-range that will provide for adequate transmission through the entire composite. For example, ceramic layers, inner layers and intermediate layers may be chosen to allow transmittance of the full spectrum of visible light. Non-exhaustive examples of intermediate layer materials include glasses, ceramic and polymeric materials. An intermediate layer may be bonded to an inner layer or an outer layer either mechanically or with an adhesive. Appropriate adhesives include, for example, polyurethanes, thermoplastic polyurethanes, epoxies, silicones and metal-based adhesives.

Layers of a composite may be joined together using a combination of heat and pressure. Preferably, the sheet layers are firmly secured to each other and optical clarity is retained or improved. When used for viewing applications, such as transparent armor, optical clarity may be important and transmission values of greater than 70%, greater than 75%, greater than 80% or greater than 85% are preferred. A haze value of less than 3% may also be preferred.

To form the composite, the sheets can be temporarily fastened together, for example, with tape, and then placed into a vacuum bag. The bag may be placed in a chamber such as an autoclave and a vacuum may be drawn on the bag. The amount of vacuum can vary from application to application and may be, for example, greater than 100 mTorr, greater than 50 mTorr or greater than 10 mTorr. While under partial vacuum in the bag, the chamber may be pressurized and/or heated. Pressures that may be used include atmospheric, greater than atmospheric, greater than 2 bar, greater than 4 bar or greater than 8 bar. In some embodiments, pressure may be applied in a pressure chamber or by mechanical means, for instance, rollers or a press. Pressure and heat may be applied until the polymer sheet reaches a softening point, allowing air bubbles to be expelled and allowing the polymer (PVB, for instance) to clarify and flow.

The softening temperature may be, for example, greater than 70 degrees C., greater than 80 degrees C., greater than 90 degrees C., greater than 100 degrees C., greater than 120 degrees C., greater than 150 degrees C., greater than 160 degrees C., greater than 200 degrees C. or greater than 250 degrees C. An optimum temperature is dependent, in part, on pressure applied and on the specific material that is used to bind the sheets of ceramic (sapphire), glass and polycarbonate together.

As air bubbles are expelled and the polymer softens, optical clarity through the window may improve and the composite may become transparent. Observation of this change can help indicate when optimum pressure and temperature combinations are obtained. Imperfections or unevenness on the inner facing surfaces of the sapphire or glass may be filled by the flowing PVB. After polymerization or hardening or cooling, the components of the composite remain securely immobilized in relation to each other and any tape or other retainer may be removed. Different methods may be used to test the ability of a ceramic composite to withstand a specific impact. In one method, a ceramic composite, such as ceramic armor, can be supported securely in a stand and impacted with a projectile, such as a round from a rifle. The ceramic armor is considered to be completely penetrated when the round passes through the inner layer, e.g., a polycarbonate layer. To determine a $V_{50}$ for a specific projectile, the projectile is fired at zero degrees obliquity into the armor at a number of different velocities. The two highest velocities that do not penetrate the armor are averaged with the two lowest velocities that do penetrate the armor to arrive at a $V_{50}$. All ballistic test results reported herein are determined using projectiles fired at zero degrees of obliquity, or as close as reasonably possible given the test technique, unless otherwise stated.

In some embodiments, the ceramic composite may be capable of preventing penetration and/or achieving a $V_{50}$ of at least 740 m/s, greater than 800 m/s, greater than 843 m/s, greater than 850 m/s, greater than 900 m/s, greater than 950 m/s, greater than 1000 m/s or greater than 1100 m/s. In various embodiments, these levels can be achieved for protection against projectiles including caliber 0.30 AP, caliber 0.50, 7.62×51 M-80 Ball, 7.62×39 API-BZ, 7.62×51 AP(M61), 7.62×54R B32 (Dragonov), and 7.62×51 AP-WC. For protection against these projectiles, in different embodiments the areal density of the composite may be, for example, less than 200 kg/m$^2$, less than 165 kg/m$^2$, less than 135 kg/m$^2$, less than 110 kg/m$^2$, less than 80 kg/m$^2$, less than 70 kg/m$^2$, less than 58.7 kg/m$^2$, less than 50 kg/m$^2$, or less than 40 kg/m$^2$. For caliber 0.50 AP protection, the composite may have an areal density, for example, of less than 200 kg/m$^2$, less than 150 kg/m$^2$, less than 120 kg/m$^2$, less than 100 kg/m$^2$, less than 80 kg/m$^2$, or less than 50 kg/m$^2$. Higher areal densities may be used in composites designed to prevent penetration of multiple shots impacting the same composite.

EXAMPLES

Several samples of sapphire composites were built and evaluated via ballistic testing to determine their effectiveness as transparent armor. Results show that ceramic based transparent composites, as described herein, can be effective at preventing the penetration of a variety of projectiles including single and multiple shots. Furthermore, this level of protection can be obtained at areal densities and thicknesses that are below those of conventional glass type armor.

Eleven different projectile tests were run on two different composite laminates. Each laminate had a length of 150 mm and a width of 150 mm. Sapphire sheets of these sample laminates are produced by edge defined film fed growth techniques unless otherwise specified.

Each composite was produced as follows. The component layers were stacked together and secured with tape and placed in a vacuum bag. A vacuum was applied to the bag which was then placed in an autoclave where pressure of about 8 bars (116 psi) was applied to the stack. Thus, the stack was under vacuum inside the bag but pressurized in the autoclave. The temperature was raised to a level where the PVB layers would start to flow, approximately 125 degrees Celsius. Appropriate temperatures may vary with pressure—when flow occurs, the PVB clarifies and this clarification can be noticed by an observer and can be used to choose an appropriate temperature. The pressure and temperature were maintained for about 150 minutes. The pressure was then released and the composite laminate allowed to cool. After cooling, the tape was removed and the layers were securely joined together with the composite exhibiting excellent optical properties for haze and transparency.

In the first eight tests (Group A), the following sapphire composite laminate was used (layers were arranged in the order provided but a specific temporal order of placement of the layers should not be inferred):

Composite A included, in physical order, 6.35 mm sapphire sheet, a 0.76 mm PVB sheet, an 8 mm glass sheet, a 3 mm sheet of TPU, and a 3 mm sheet of polycarbonate to produce a five layer composite laminate. The resulting composite is referred to in Tables 1 and 2 as "6.35 sapphire/ 0.76PVB/8 mm Glass/3 mmTPU/3 mm PC." Areal density was 52.12 kg/m$^2$. An additional three tests (Group B) were performed using the following laminate:

Composite B included, in physical order, a 6.35 mm sapphire sheet, a 0.76 mm PVB sheet, a 12 mm "diamond glass" (water white, low iron glass) sheet, a 0.76 mm PVB sheet, a 4 mm RC diamond glass (chemically strengthened glass) sheet, a 2.5 mm TPU sheet, and a 3 mm polycarbonate (PC) sheet to produce a seven layer composite laminate. The resulting composite is referred to in Table 1 as Composition B. Areal density was 72.78 kg/m$^2$. Composition B was also analyzed to determine Luminous Transmission and Haze values. Luminous transmission values were determined to be from 85.3 to 85.9% transmission. Haze values for the same samples were determined to be from 0.99 to 1.25%. These transmission and haze values indicate that the composites may be useful in transparent armor applications where clear vision may be important.

Additional tests were performed on different laminate compositions for defeating different projectiles. Composites C, D, E and F included the following components:

Composite C included, in physical order: a 6.35 mm sapphire sheet, a 0.76 mm PVB sheet, a 12 mm "diamond glass" (water white, low iron glass) sheet, a 0.76 mm PVB sheet, a 4 mm RC diamond glass (chemically strengthened glass) sheet, 0.94 mm FAE. Areal density was 67.46 kg/m$^2$.

Composite D included 10 components, in physical order: a 6.35 mm sapphire sheet, a 0.76 mm PVB sheet, a 6.35 mm sapphire sheet, a 0.76 mm PVB sheet, a 12 mm "diamond glass" (water white, low iron glass) sheet, a 0.76 mm PVB sheet, a 12 mm "diamond glass" (water white, low iron glass) sheet, a 0.76 mm PVB sheet, a 3 mm RC diamond glass (chemically strengthened glass) sheet, 0.94 mm FAE. Areal density was 159.21 kg/m$^2$.

Composite E included 10 components, in physical order: a 7.62 mm sapphire sheet, a 0.76 mm PVB sheet, a 7.62 mm sapphire sheet, a 0.76 mm PVB sheet, a 12 mm "diamond glass" (water white, low iron glass) sheet, a 0.76 mm PVB sheet, a 12 mm "diamond glass" (water white, low iron glass) sheet, a 0.76 mm PVB sheet, a 3 mm RC diamond glass (chemically strengthened glass) sheet, 0.94 mm FAE. Areal density was 169.11 kg/m$^2$.

Composite F included components, in physical order: a 7.62 mm sapphire sheet, a 0.76 mm PVB sheet, a 12 mm "diamond glass" (water white, low iron glass) sheet, 0.76 mm PVB sheet, a 10 mm "diamond glass" (water white, low iron glass) sheet, a 0.76 mm PVB sheet, a 4 mm "diamond glass" (water white, low iron glass) sheet, a 0.76 mm PVB sheet, a 3 mm "diamond glass" (water white, low iron glass) sheet, a 1.25 mm TPU sheet, 0.94 mm FAE. Areal density was 107.97 kg/m$^2$.

Testing Procedure

Each sapphire composite sample was in the form of a 150×150 mm piece and was ballistically tested using a single shot (except multi-shot sample 19). The composite physical properties and ballistic results are shown in Table 1. Under the "penetration" column a result of "yes" means that at least the resulting spalling passed through the final polycarbonate layer (the final polycarbonate layer was penetrated). A result of "no" means that there may have been partial penetration of the sapphire face and glass, but that the projectile did not pass through the composite and that the spalling was contained by the polycarbonate layer (the final polycarbonate layer was not penetrated).

The ballistic tests were performed under controlled conditions at certified ballistic ranges. All shots were fired at zero degrees of obliquity in relation to the surface of the composites. For samples 1-8, the projectile was fired at a distance of 10 m and an optical velocity detector was used to determine the projectile velocity 2.5 m in front of the target. For samples 9-18, the projectiles were fired at a distance of 50 m and an optical velocity detector was used to determine the projectile velocity at 6.5 m in front of the target. For sample 19, the projectile was fired at a distance of 3.2 m and a light screen box was used to determine the projectile velocity at 1.1 m in front of the target.

Figure 3B:
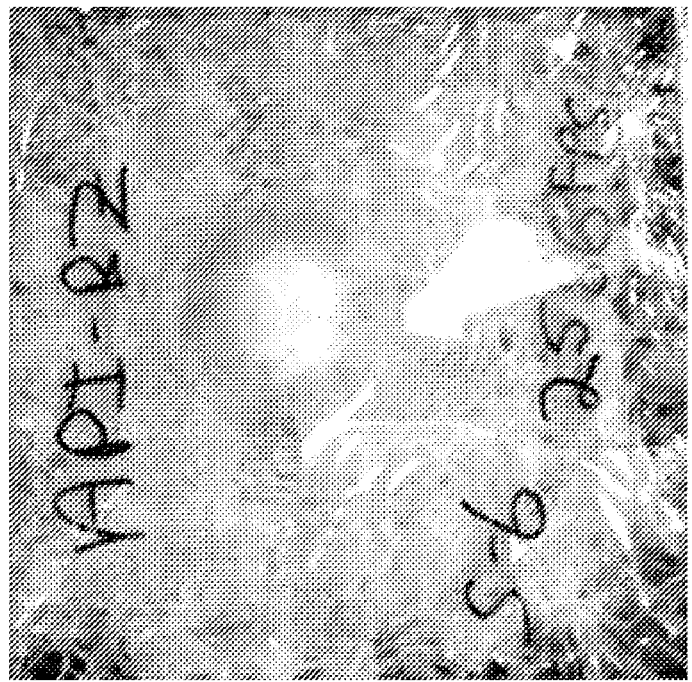
FIGS. 3A and 3B are photocopies of photographs of certain embodiments of the invention after projectile testing.
Figure 3A:
Figures 4A, 4B:
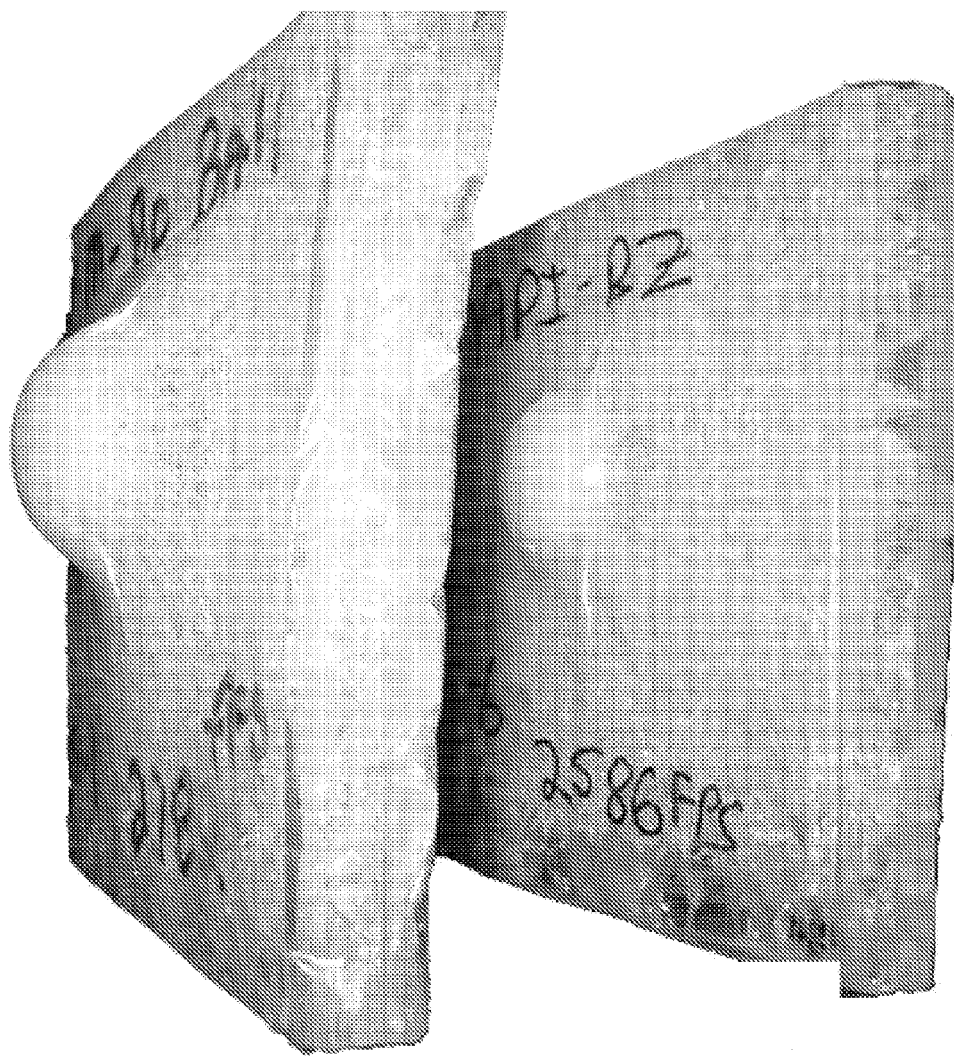
FIGS. 4A and 4B are photocopies of photographs of certain embodiments of the invention after projectile testing.

The first samples tested (Sample ID #1 through 8, see Table 1 (FIG. 2)) were 21.1 mm thick and had an areal density of 52.12 kg/m². This composite make-up defeated the 7.62×51 mm M80 ball at a velocity of 835 m/s (Sample ID#1). The deformation of this transparent armor system may be seen in FIGS. 3A and 4A. Using this same configuration (Sample ID# 2-4), it was then tested using the 7.62×39 mm API-BZ. The system also defeated this projectile at three different velocities, up to 776 m/s. The deformation of the 776 m/s projectile is shown in FIGS. 3B and 4B.

Testing of the 7.62×51 mm AP M61 (hard steel core) projectile was performed on the 21.1 mm thickness (Sample ID# 5-8, see Table 1 (FIG. 2). This projectile was defeated (partial penetration) when fired at 768 m/s.

The next test composite subjected to ballistic testing was thicker (Composite B, Sample ID#9-11, see Table 1) at 29.4 mm and an areal density of 72.78 kg/m². This composite defeated (partial penetration) the 7.62×54R B32 API projectile (Dragonov) at a velocity of 858 m/s. It is believed that a glass-only solution to defeat this projectile would be over 50 mm thick and have an areal density greater than 115 kg/m².

Test sample test number 12 was performed on Composite C having a thickness of 24.87 mm and an areal density of 67.46 kg/m². The composite successfully defeated a 7.62×54R B32 projectile impacting at 864 m/s.

Test samples 13-14 were performed on Composite D having a thickness of about 43.7 mm and an areal density of 159.21 kg/m². The composite successfully defeated a 7.62×51 AP-WC projectile impacting at 917 m/s.

Test samples 15-18 were performed on Composite E having a thickness of about 46.3 mm and an areal density of 169.1 kg/m². The composite successfully defeated a 7.62×51 AP-WC projectile impacting at 918 m/s.

Test sample 19 was performed on Composite F having a thickness of about 41.85 mm and an areal density of 107.97 kg/m². Unlike other tests, the composite measured 300 mm by 300 mm. Three shots (multi test) were fired in sequence at the same composite sample (#19) near the center of the panel 120 degrees from each other and approximately 150 mm apart. The composite successfully defeated three successive 7.62×63 mm APM2 projectiles impacting at about 850 m/s.

Optical Tests

The sapphire-based composites tested above showed optical transparency superior to that of glass-based composites capable of providing an equal level of protection. Luminous transmission and haze were measured using techniques in accordance with ASTM D1003-00, the standard test method for haze and luminous transmittance of transparent plastics. A hazemeter was used in the measurement. A sapphire transparent armor system at 29.4 mm thickness (Composite B) exhibited a transmission greater than 85%, with haze levels around 1%. Increasing the thickness of the system by adding additional glass layers to 41.1 mm thickness reduces the transmission to around 84%, with no detectable change in haze. For comparison, typical glass armor that has similar ballistic protection to the 29.4 sapphire transparent armor system exhibits a luminous transmission of 73% and haze of about 0.6%.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

All references, patents and patent applications and publications that are cited or referred to in this application are incorporated in their entirety herein by reference.

What is claimed is:

1. A composite transparent armor having a $V_{50}$ of greater than 843 m/s for caliber .30 AP projectiles, the armor having a length or width greater than 25 cm, an areal density of less than 58.7 kg/m² and a luminous transparency of greater than 75%.

2. The armor of claim 1 wherein the armor has an areal density of less than about 55 kg/m².

3. The armor of claim 1 having a luminous transparency of at least 80%.

4. The armor of claim 1 having a haze value of less than 3%.

5. A wheeled vehicle, spacecraft or aircraft comprising the composite armor of claim 1.

6. A composite transparent armor having a $V_{50}$ of greater than 835 m/s for a 7.62×51 mm M80 ball, the armor having a length or width greater than 25 cm, an areal density of less than 60.0 kg/m² and a luminous transparency of greater than 75%.

7. The armor of claim 6 wherein the armor has an areal density of less than about 55 kg/m².

8. The armor of claim 6 having a luminous transparency of at least 80%.

9. The armor of claim 6 having a haze value of less than 3%.

10. A wheeled vehicle, spacecraft or aircraft comprising the composite armor of claim 6.

11. A composite transparent armor having a $V_{50}$ of greater than 858 m/s for a 7.62×54R B32 API projectile, the armor having a length or width greater than 25 cm, an areal density of less than 115 kg/m² and a luminous transparency of greater than 75%.

12. The armor of claim 11 wherein the armor has an areal density of less than or equal to 72.78 kg/m².

13. The armor of claim 11 having a luminous transparency of at least 80%.

14. The armor of claim 11 having a haze value of less than 3%.

15. A wheeled vehicle, spacecraft or aircraft comprising the composite armor of claim 11.

16. A composite transparent armor having a $V_{50}$ of greater than 918 m/s for a 7.62×51 AP-WC projectile, the armor having a length or width greater than 25 cm, an areal density of less than 200 kg/m² and a luminous transparency of greater than 75%.

17. The armor of claim 16 wherein the armor has an areal density of less than or equal to 159.21 kg/m².

18. The armor of claim 16 having a luminous transparency of at least 80%.

19. The armor of claim 16 having a haze value of less than 3%.

20. A wheeled vehicle, spacecraft or aircraft comprising the composite armor of claim 16.

* * * * *